March 8, 1960 A. H. B. WALKER 2,928,036

CIRCUIT ARRANGEMENTS INCORPORATING SEMI-CONDUCTOR DEVICES AND TO SEMI-CONDUCTOR DEVICES FOR USE THEREIN

Filed Sept. 13, 1955 4 Sheets-Sheet 3

March 8, 1960 A. H. B. WALKER 2,928,036

CIRCUIT ARRANGEMENTS INCORPORATING SEMI-CONDUCTOR DEVICES AND TO SEMI-CONDUCTOR DEVICES FOR USE THEREIN

Filed Sept. 13, 1955 4 Sheets-Sheet 4

United States Patent Office 2,928,036

Patented Mar. 8, 1960

2,928,036

CIRCUIT ARRANGEMENTS INCORPORATING SEMI-CONDUCTOR DEVICES AND TO SEMI-CONDUCTOR DEVICES FOR USE THEREIN

Alec Hervey Bennett Walker, King's Cross, London, England, assignor to Westinghouse Brake & Signal Company Limited, London, England Application September 13, 1955, Serial No. 534,118

Claims priority, application Great Britain September 24, 1954

11 Claims. (Cl. 321—8)

This invention relates to circuit arrangements incorporating semi-conductor devices of known type having a base electrode, an emitter electrode and a collector electrode, whether incorporating point contact emitter and collector electrodes or of the so-called "area or junction" type.

In both these types of semi-conductor device the base electrode makes non-rectifying contact with a surface of the semi-conductor and both possess the known property that the current flowing in a load circuit connected in series with a power supply, between the collector electrode and the base may be controlled by adjusting the flow of current between the emitter and base electrodes. This property enables the device to be employed in known manner as an amplifier.

It is the object of this invention to provide circuit arrangements by means of which a semi-conductor device of the kind described may be used as an alternating current rectifier the output of which is controllable over a wide range with a minimum absorption of power by the device itself.

According to the invention, a circuit arrangement for the control of an electric current devised from an alternating current source and supplied to a load circuit, comprises a semi-conductor device having a base electrode, an emitter electrode and a collector electrode, said collector electrode being connected in series with said load circuit, means for providing adequate emitter current (as hereinafter defined) during at least part of alternate half cycles of the source and means for preventing the flow of said current during the other half cycles.

The invention also comprises a novel construction of junction type semi-conductor devices, suitable for use in certain circuit arrangements embodying the invention, comprising an emitter electrode and a collector electrode each composed of a first conductivity type (e.g. P-type) semi-conductor and each having a rectifying junction with a base electrode composed of a second conductivity type (e.g. N-type) semi-conductor, all in known manner, and a further layer of said second conductivity type semi-conductor making a rectifying contact with one of said electrodes of said first conductivity type semi-conductor.

In the drawings accompanying the specification:

Figure 3:
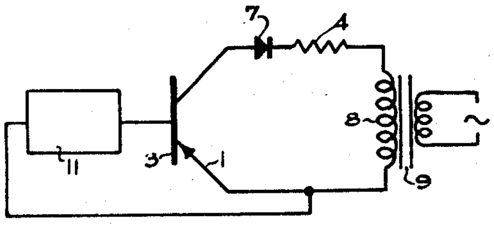
Figure 3 shows a modification of the arrangement shown in Figure 2.
Figure 4:
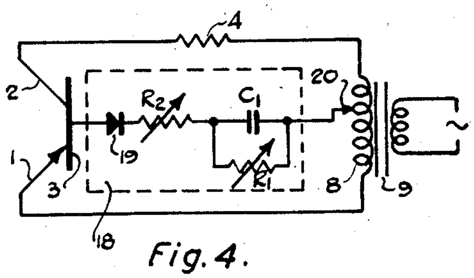
Figure 5A:
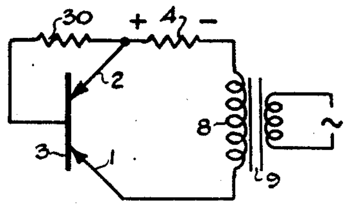
Figure 5B:
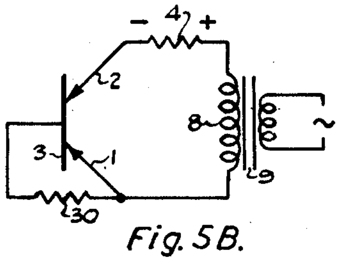
Figure 6:
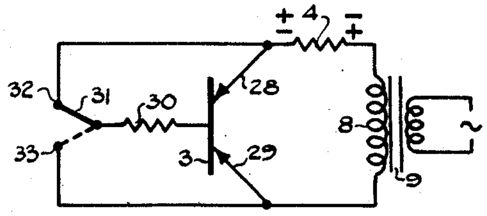
Figure 6A:
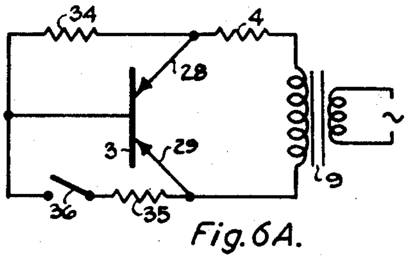
Figure 7:
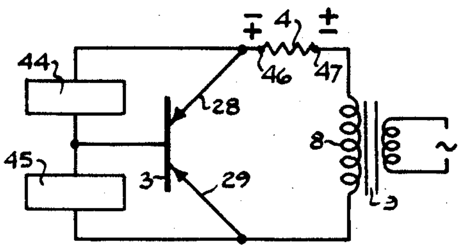
Figure 8:
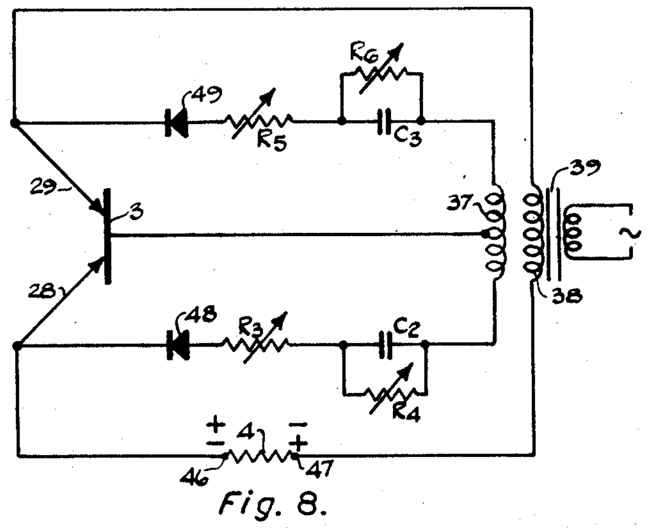

Figure 4 shows a modification of circuit arrangements of Figure 3;

Figures 5A and 5B show other circuit arrangements embodying the invention;

Figure 6 shows a combination of the circuit arrangements of Figures 5A and 5B to enable the polarity of the load voltage to be reversed;

Figure 6A shows a modification of the arrangement shown in Figure 6;

Figure 7 shows a circuit arrangement embodying the invention which enables the load to be both reversible and controllable;

Figure 8 shows an elaboration of the arrangement shown in Figure 7; and

Figure 9:
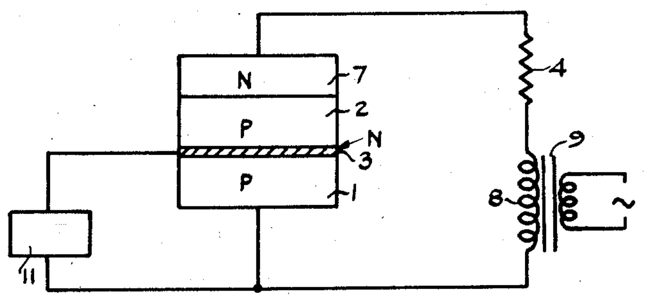

Figure 9 shows in diagrammatic form the construction of a junction type semi-conductor device suitable for use in certain of the circuit arrangements embodying the invention.

It is to be understood that in the drawings, the electrodes of the semi-conductor device are indicated by conventional symbols and that these symbols are intended to represent electrodes of both types mentioned above, that is to say both those employing point contact and those of the area or junction type.

It is also to be understood that where polarities of voltages and currents are indicated in the drawings, and mentioned in the following description, they are those appropriate to semi-conductor devices of the so-called P-N-P formation, and that should devices of the N-P-N formation be employed the polarities must be reversed.

Figures 1, 1A:
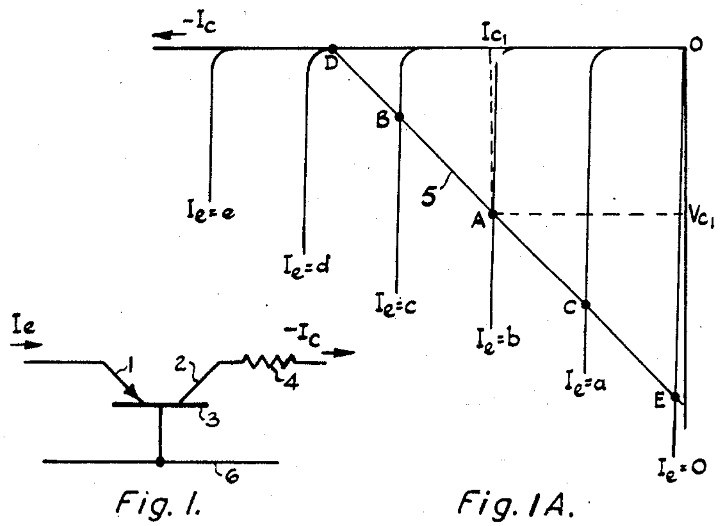
Figure 1 shows part of a known circuit arrangement suitable for the employment of a semi-conductor device of the kind described as an amplifier.
Figure 1A illustrates in graphical form the voltage/current characteristics of the arrangement shown in Figure 1.

Referring first to Figure 1, there is here represented a part of a known circuit arrangement of a semi-conductor device of the kind described employed as an amplifier. The device is represented in conventional manner as comprising an emitter electrode 1, a collector electrode 2 and a base electrode 3. The emitter electrode and the collector electrode, hereinafter termed the emitter and the collector, respectively, make rectifying contact with a surface of a semi-conducting crystal with the opposite surface of which the base electrode, hereinafter referred to as the base, makes non-rectifying contact, in known manner. Connected in the collector circuit is a load represented by a resistor 4, between which and a common conductor 6, connected to the base 3, is connected a suitable source of electric current not shown, so poled that the base 3 is positive relative to the collector. Connected between the emitter 1 and the common conductor 6 is an adjustable direct current supply, not shown, so poled that the emitter is positive relative to the base and from which is derived an emitter current $I_e$ the flow of which is necessary to enable current $I_c$ to flow in the collector circuit and the magnitude of which determines the magnitude of the current $I_c$ and the collector voltage $V_c$, between collector and base, for a predetermined load. The collector current $I_c$ flows, across the rectifying junction between the collector and base electrodes in the high resistance or reverse direction, and as indicated by the arrow in Figure 1, and is accordingly indicated in Figures 1A and 3A as a negative current.

The voltage/current characteristics of this circuit arrangement are illustrated in Figure 1A in which collector current $I_c$ is plotted against collector voltage $V_c$ for a given load and a range of emitter currents $I_e$. An emitter current $I_e=b$, for example, determines a collector voltage $V_{c_1}$ and collector current $I_{c_1}$ for a given load resistance and supply voltage, represented by an operating point A. If the emitter current is increased to $I_e=c$ or decreased to $I_e=a$, the load resistance remaining the same, other operating points, B and C respectively, are obtained, all three lying on the load line 5, and by adjusting the magnitude of the emitter current the collector current and voltage may thus be adjusted accordingly. It will be noticed that when operating at any one of these three points, or at other intermediate, points along the line 5, there is an appreciable power loss in the semi-conductor device represented by the product of $V_c$ and $I_c$.

In order that the device may be worked at a high efficiency and also that it may be employed to control a relatively large amount of power it is necessary that the power loss in the device itself be kept as small as possible. It will be noticed that there are two operating points D and E, at either end of the load line 5 in Figure 1A, at which the power loss is very small, the voltage $V_c$ being very small at point D and the current $I_c$ being very small at point E. These two operating points represent the collector voltages and currents corresponding to emitter currents of $I_e=d$ and $I_e=0$ respectively and, if it can be arranged that the device operates for the maximum amount of time at one or other of these two points and takes the minimum amount of time transferring from one to the other, the power lost will be reduced to a minimum. Such an arrangement would no longer behave as an amplifier but only as a switching device.

From Figure 1A it also appears that for every value of collector current $I_c$ there is a minimum value of emitter current $I_e$ which will prevent the rise of the collector voltage $V_c$ above a value which is substantially zero and this value of emitter current is herein termed "adequate" emitter current, whilst the collector voltage when thus restricted is referred to as being "bottomed."

Figure 2A:
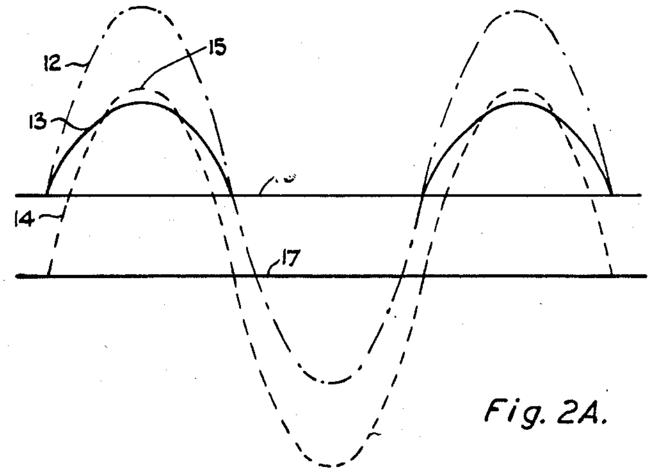
Figure 2A illustrates in graphical form one method of controlling the emitter current in the arrangement of Figure 2.
Figure 2:
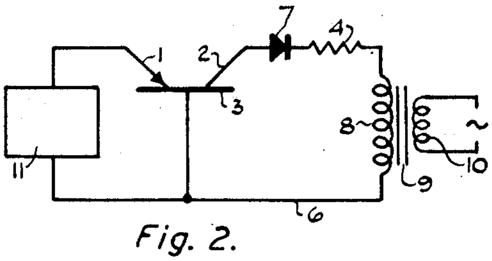
Figure 2 shows one circuit arrangement embodying the invention.

Figure 2 shows one simple arrangement embodying the invention in which the semi-conductor device is employed as a controllable half-wave rectifier. In this circuit arrangement the collector circuit comprises a half-wave rectifier 7 connected in series, with the load 4 and the secondary winding 8 of a transformer 9 the primary winding of which is connected to an alternating current supply. The emitter circuit comprises a suitable source 11 of emitter current. With this circuit arrangement, during the half cycles of the supply voltage when the upper terminal of the transformer secondary winding is positive, hereinafter referred to as positive half-cycles, the rectifier 7 prevents flow of current in the collector circuit, in the low resistance or forward direction. During the half cycles when the upper terminal of the transformer secondary winding is negative, hereinafter referred to as negative half cycles, if the emitter current is zero substantially no current will flow in the collector circuit and the device will operate at point E of Figure 1A, where the power loss in the device is negligible.

If during the negative half cycles the emitter current is at all times "adequate" as hereinbefore defined, then the collector voltage will be bottomed and will operate along the line OD in Figure 1A. During these half cycles therefore, the collector voltage being substantially zero, the power loss in the device is very small and practically the whole of the output voltage of transformer 9 appears across the load.

It is evident that one way to ensure that the collector voltage remains low during the whole of the negative half cycle is to provide a direct current in the emitter circuit of suitable polarity and sufficient magnitude to ensure that the collector voltage is bottomed at the peak of the collector current. This, however, would be unnecessarily high during the remainder of the half cycle and would result in unnecessarily high losses in the emitter circuit, and all that is necessary is to provide at every instant during the negative half cycle only adequate emitter current to ensure that the current demanded by the load at that instant flows in the collector circuit whilst the collector voltage remains bottomed. In this manner the collector current, which is also the load current, may be switched on and off with little power lost in the semi-conductor device in either condition, but in order to regulate the load current means must be provided for continuous control between these two conditions. This cannot, without the losses which it is desired to eliminate as far as possible, be achieved by simply varying the magnitude of a direct current emitter current because the collector voltage would not remain bottomed and the device would work along the load line 5 of Figure 1A, as described above, resulting in considerable losses in the device.

In order to obtain the desired control it is necessary to ensure that the emitter current changes rapidly between zero and the "adequate" value at points during the negative half cycle of the supply voltage, the control of the load current being obtained by controlling the position of these change-over points.

One simple manner in which this control can be achieved is to use as the source 11 of the emitter current a mixture of alternating and direct current, the alternating current being of such a magnitude that, without the direct current component, it is more than "adequate" during the whole of the half cycle, and the direct current being variable and so poled that, as it is increased in magnitude, the emitter current is reduced and falls below the "adequate" value at each end of the half cycle.

The make-up of such a composite emitter current is illustrated in Figure 2A in which curve 13 represents the "adequate" value of emitter current and curve 12 represents the alternating current component. The direct current component, which is adjustable, is represented by the base line 17, its spacing from the base line 16 being a measure of the magnitude of the direct current component. The resultant curve 14 is in the sum of the two components, being the curve 12 displaced by the magnitude of the direct current component, thus the portion of this curve which lies above the base line 16 represents that portion of the half cycle during which the collector current flows, it being understood that although, for the purpose of illustration, the curve 14 extends below the base line 16, the emitter 1 is biassed negatively with respect to the base electrode 3 during this portion of the half cycle and both emitter and collector currents are substantially zero.

The portion 15 of the curve 14 which rises above the curve 13 determines that portion of the cycle during which the emitter current is "adequate" and thus the period during which collector current flows and the collector voltage is bottomed and it will be evident that, by adjusting the magnitude of either component, the portion of the half cycle during which emitter current is "adequate," and thus the output of the device, is also adjusted.

It will be noticed that during the time between the intersection of the curve 14 and the base line 16 and its intersection with the curve 13 the emitter current is less than "adequate" and during this time, therefore, the collector voltage is not bottomed and a certain amount of power is absorbed by the device. This period, however, is very short and can be reduced to a minimum by employing an alternating current having a steeper wave form than the curve 12, the latter being of the form shown in the drawing for the sake of clarity.

An alternative method of control may be provided in the form of a phase shifting arrangement by means of which the instant at which "adequate" emitter current is supplied may be adjusted, and this current may then persist for the remainder of the half cycle if desired.

Briefly, the desired circuit arrangement has the following features:

(*a*) The emitter current is changed from zero to "adequate" value as rapidly as possible at the moment when the device is required to commence conduction;

(*b*) The emitter current is maintained at or above the "adequate" value during substantially the whole of the period during which the conduction is required to persist; and (c) The emitter current is reduced to zero as rapidly as possible at the moment when conduction is required to cease.

As an alternative to reducing the emitter current rapidly to zero, it may in some cases be desirable to permit the conduction to persist for the remainder of the half cycle, in order to avoid switching-off transients.

Figure 3A:
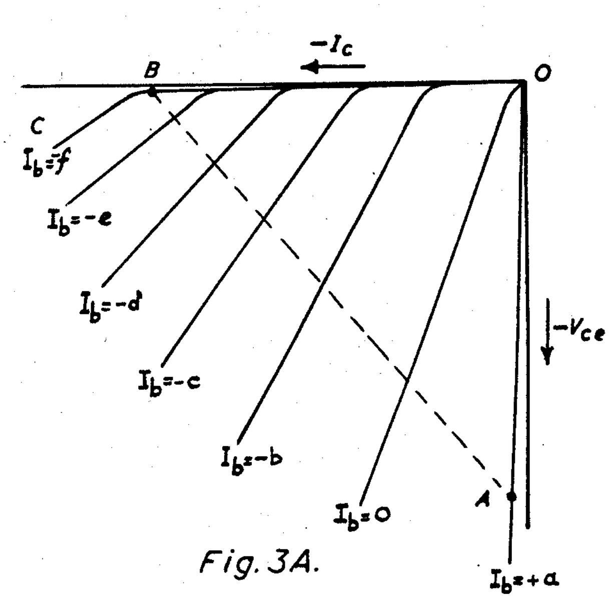
Figure 3A illustrates in graphical form the voltage/ current characteristics of the arrangement shown in Figure 3.

Turning now to Figures 3 and 3A, the circuit arrangement depicted in Figure 3 differs from that of Figure 2 in that the source 11 is connected in series with the base 3 instead of with the emitter 1. As in the arrangement of Figure 2, so also with this arrangement, the semi-conductor device will conduct only when current flows in the emitter circuit during negative half cycles of the alternating current source connected to the transformer 9 and the collector voltage will be bottomed when this emitter current is "adequate."

In this case, however, with a junction type semi-conductor device the greater part of the emitter current is provided by the load current, which flows in the emitter, and only a small proportion has to be supplied by the source 11 to bring the power emitter current up to the "adequate" value. The power necessary to control the output of the semi-conductor device is thus considerably reduced. The current flowing between the source 11 and the base electrode is referred to herein as the base current; $Ib$ and Figure 3A illustrates a family of curves of the voltage between collector and emitter and collector current for various values of base current which are in general similar to those shown on Figure 1A but are somewhat less steep. The base current is considered to be positive when flowing into the base from the source 11, and for any value of collector current $Ic$ there is a value of base current $Ib$ which must be added to $Ic$ to produce the necessary "adequate" emitter current to bottom the voltage $Vce$. It will be noted that it is necessary to provide a positive base current in order to cut-off the load current and that, in order to obtain the desired control of the output of the device, it is necessary to transfer the operating point of the device rapidly from a point such as A, where the collector current is small, to a point such as B where the collector voltage is small, as described above.

Figure 4 shows one possible modification of the arrangement shown in Figure 3 in which the half-wave rectifier 7 is dispensed with. In this figure the load 4 is connected in series with the secondary winding 8 of transformer 9 across the emitter and collector electrodes 1 and 2 of the semi-conductor device, the base electrode of which is connected in series with a pulse generating circuit 18 to a tapping 20 of the secondary winding 8. This arrangement is such that during positive half-cycles of the alternating current supply the base is maintained sufficiently positive relative to the emitter to prevent the flow of collector current, so that the rectifier 7 of the previously described arrangements is no longer required, and pulses of negative base current are supplied during negative half cycles to control the conduction of the semi-conductor device. This dual function is performed by the pulse generating circuit 18 which comprises a half-wave rectifier 19 and a variable resistor $R_2$ connected in series with a parallel connected capacitor $G_1$ and variable resistor $R_1$.

In this circuit, if the magnitude of $R_1$ is made high and that of $R_2$ low, during negative half cycles of the alternating current supply the capacitor $C_1$ is charged up to the peak voltage of the tapping 20, the charging current, which flows from the emitter to the base and is thus a negative base current, being arranged to be of such a magnitude as to render the total emitter current "adequate." A short pulse of negative base current occurs each negative half cycle to keep capacitor $C_1$ charged. During the positive half cycles the voltage to which $C_1$ is charged is added to the tap voltage and renders the base more positive than the voltage of the secondary winding 8, thus making both the collector and emitter negative relative to the base which prevents the flow of emitter current. Collector current thus flows only during the pulses of the condenser charging current. In order to adjust the length of these pulses, and thus to adjust the conduction angle and the power supplied to the load, the resistors $R_1$ and $R_2$ may be adjusted accordingly to adjust the value to which the condenser voltage falls during the positive half cycles and the time taken to recharge it during the successive negative half cycles. The wider the range over which it is desired to exercise control the nearer the tap voltage must approach the full secondary voltage of the transformer in order to ensure that, in spite of a reduction in the mean voltage of the capacitor C due to the reduced voltage down to which it is permitted to discharge, the base is still held more positive than the collector during the positive half cycles of the supply. It will be noted that, although the arrangement shown in Figure 4 includes a half-wave rectifier 19, this rectifier has to carry only the charging current of condenser C1 and may accordingly be considerably smaller than the rectifier 7 of Figure 3, which has to carry the load current.

It will be apparent that there are many other ways of producing the required combination of negative pulses of base current and positive bias, that indicated in Figure 4 being a simple method shown by way of example and for ease of description.

From the foregoing it is seen that if, in an arrangement such as that shown in Figure 3, a positive base current, as hereinbefore defined, is supplied (point A in Figure 3A), the collector impedance becomes very high and substantially no current flows in the load circuit, whereas a negative base current of predetermined magnitude results in the collector voltage being bottomed. Furthermore, the semi-conductor device may, in known manner, be constructed so that the emitter will function as a collector and the collector will function as an emitter. Such a device may be termed symmetrical or reversible, and may be indicated by providing each of these two electrodes with an arrow head as shown, for example, in Figures 5A and 5B.

Referring now to Figure 5A, a suitable resistor 30 is connected between the base 3 and the electrode 2, the resistance of the resistor being of such a magnitude that during negative half cycles of the supply voltage it passes sufficient negative base current to cause the voltage between electrodes 1 and 2 to be bottomed, electrode 1 functioning as the emitter, whilst during positive half cycles electrode 2 becomes the emitter and the base current is positive, i.e. flowing from the resistor 30 into the base, and the device presents a high impedance and substantially no current flows in the load circuit, the device working at point A of Figure 3A. Half wave rectification is thus obtained and a mean voltage develops across the load 4 having the polarity indicated in the drawing.

In Figure 5B the resistor 30 is connected between the base 3 and the electrode 2 and with this arrangement current flows in the load circuit during positive half cycles of the supply voltage and the polarity of the voltage developed across the load is reversed.

It will thus be seen that the polarity of the load voltage may be reversed without breaking the load circuit by transferring the base feed resistor 30 from one electrode to the other, the current in this circuit being made less than that in the load circuit. A simple method of transferring the resistor from one electrode to the other is illustrated in Figure 6.

The resistor 30, in this arrangement is connected between the base 3 and a single pole, double throw switch having a moving contact arm 31, to which is connected the resistor 30, and a pair of fixed contacts 32 and 33, to which are connected electrodes 28 and 29 respectively.

The load 4 is connected in series with the secondary winding 8 of the transformer 9 across the electrodes 28 and 29. With this arrangement the polarity of the load voltage may be simply and quickly reversed without breaking the main power circuit, the necessary switching being carried out in the control circuit, the power in which is considerably less than that in the main circuit.

A modification of the arrangement shown in Figure 6 is shown in Figure 6A. In the arrangement of this figure the resistor 30 of Figure 6 is replaced by two resistors 34 and 35, connected between the base 3 and the electrodes 28 and 29 respectively, the resistor 35 being connected to the base through a single pole switch 36. The resistances of the resistors 34 and 35 are so chosen that whereas with the switch open the arrangement functions in the manner described above with reference to Figure 5A, when the switch is closed, during positive half cycles of the supply, the current flowing in the circuit electrode 28—electrode 3—resistor 35 (negative base current) is greater than that flowing from electrode 28 through resistor 34 to the base 3 (positive base current), so that the resultant base current is negative and electrode 28 functions as the emitter the current in which is "adequate." It will thus be seen that the load voltage may be instantly reversed by the opening and closing of the switch 36 without interrupting either the control circuit or the power circuit. It should be noted that, although, when the switch 36 is closed, an alternating current will flow in the series circuit composed of the load and the resistors, 34 and 35, the magnitudes of the resistances of these two resistors are sufficiently great in comparison with that of the alternative path through the semi-conductor to render this alternating current negligible in comparison with the total load current.

By combining the control features of Figure 4, for example, with the reversible feature just described it is possible to provide an adjustable and reversible output from the device. To achieve such a result it is necessary to provide suitable pulses of negative base current of variable duration from two sources which also ensure that the base is at all other times maintained at a positive potential of sufficient magnitude to prevent conduction. One circuit arrangement having the desired features is indicated in Figure 7. In this arrangement a suitable source 44 of pulses of negative base current and positive bias is connected between the base 3 and electrode 28 and a similar source 45 is connected between the base 3 and electrode 29.

If each of the two sources 44, 45 maintains the base sufficiently positive with respect to the other electrode to which it, the source, is connected, then there will be no conduction and no current can flow in the load. If now source 44 injects a pulse of negative base current at a time during the half cycle when the lower end of the transformer is negative, electrode 28 will act as an emitter and electrode 29 as a collector and the device will conduct. Assuming the pulse of negative base current to be large enough, the collector voltage will be bottomed and substantially the full transformer secondary voltage will appear across the load 4, terminal 46 being negative and terminal 47 positive. Similarly, if source 45 injects a pulse of negative base current at a time during the half cycle when the upper end of the transformer is negative, electrode 29 will act as an emitter and electrode 25 as a collector and the device will conduct, the polarity of the load being reversed, i.e. terminal 46 positive and terminal 47 negative.

The load current, of either polarity may be controlled, as hereinbefore described, by controlling the timing and the duration of the pulses of negative base current provided by the sources 44 and 45. Furthermore, if pulses of negative base current are supplied by both sources during alternate half-cycles, an alternating load current may be obtained the positive and negative periods of which are independently adjustable.

Figure 8 shows, by way of example, and in more detail, one elementary form of the circuit arrangement indicated in Figure 7, using an impulse and biassing source of the kind shown in Figure 4. In this circuit arrangement the load 4 is connected, in series with a first secondary winding 38 of a transformer 39, across electrodes 28 and 29 of the semi-conductor device, the primary winding of the transformer being connected to a source of alternating current. The base 3 of the device is connected to the mid point of a secondary winding 37 of the transformer 39, the two ends of this winding being connected each to one of the electrodes 28 and 29 through a pulse generating circuit comprising a half wave rectifier 48 (49) and a resistor $R_3$ ($R_5$) connected in series with a parallel connected resistor $R_4$ ($R_6$) and capacitor $C_2$ ($C_3$). The secondary winding 37 is such that the voltage between the tapping point and each of its ends, when added to that voltage to which the capacitor connected to that end is charged, is sufficient, during the time that that end is negative relative to the tapping point, to bias the base 3 positively relative to the electrode to which that end is connected, so as to prevent the device from conducting during that time.

If $R_4$ and $R_6$ are of a very high resistance, substantially preventing the discharge of the associated capacitors, there will be no pulses of a charging current and the voltage of the capacitor will, during the time that the upper end of the transformer winding is negative, render the base 3 sufficiently positive in relation to the electrode associated with that capacitor to prevent conduction with the result that there is substantially no conduction in either direction. If now the resistance $R_6$, for example, is reduced and the condenser $C_3$ allowed to discharge, pulses of charging current will flow in the electrode 29 which will function as an emitter and the device will conduct permitting the flow of current in the load, terminal 46 of which will be of positive polarity and terminal 47 negative. A reduction of the resistance of resistor $R_4$ will have a like effect except that the polarity of the load will be reversed.

It will thus be seen that the invention provides circuit arrangements by means of which current supplied to a load through a semi-conductor device of the kind described may be controlled over a wide range with a minimum absorption of power by the device. It is, however, to be clearly understood that the invention is by no means restricted to the use of the means described herein for producing pulses of current and for providing the necessary bias voltage, there being many such means well known in the art.

The invention also comprises a novel construction of junction type semi-conductor device, suitable for use in circuit arrangements such as that shown in Figures 2 and 3, wherein the rectifier 7 is formed integral with the device itself. Such a construction is illustrated in Figure 9 wherein the device comprises an emitter electrode 1 and a collector electrode 2, each composed of a layer of p-type semiconductor, between which is sandwiched a layer of n-type forming the base electrode 3. A further layer of n-type semi-conductor 7 is formed on a surface of the collector electrode, forming a p–n rectifying junction with that electrode. The circuit in which the device is shown connected in Figure 9 is that shown in Figure 3. It is evident however that it may also be used in the circuit of Figure 2.

Having thus described my invention what I claim is:

1. A circuit arrangement for the control of an electric current derived from an alternating current source having a tapping point and supplied to a load circuit, comprising, in combination, a semi-conductor device having a base electrode, an emitter electrode and a collector electrode, said collector electrode being connected in series with said load circuit, said source and said emitter electrode; and a pulse generating circuit connected between said tapping point and said base electrode such that, during alternate half cycles of said source, the potential between said base electrode and said collector electrode prevents the flow of current in said collector and that, during each of the other half cycles, a pulse of current generated by said pulse generating circuit is added to the current flowing in the emitter electrode and renders it of a value sufficient to prevent the collector voltage rising substantially above zero.

2. A circuit arrangement for the control of an electric current derived from an alternating current source having a tapping point and supplied to a load circuit, comprising, in combination, a semi-conductor device having a base electrode, an emitter electrode and a collector electrode, said collector electrode being connected in series with said load circuit, said source and said emitter electrode; and a pulse generating circuit connected between said tapping point and said base electrode comprising a half-wave rectifier and a first variable resistor connected in series with a parallel connected capacitor and second variable resistor, the arrangement being such that the capacitor is charged during alternate half cycles of said source by a pulse of current which flows through the emitter electrode and, added to the load current, provides an emitter current of a value sufficient to prevent the collector voltage rising substantially above zero whilst during the other half cycles the voltage to which the capacitor is charged, added to the voltage of the tapping point, produces a voltage differential between the base electrode and the detector electrode which, in the absence of emitter current, prevents the flow of current in the collector electrode.

3. A circuit arrangement for the control of an electric current derived from an alternating current source having a tapping point and supplied to a load circuit, comprising, in combination, a semi-conductor device having a base electrode, an emitter electrode and a collector electrode, said load circuit being connected in series with said source between said collector electrode and said emitter electrode; and means connected between said base electrode and said tapping point for producing emitter current of a value sufficient to prevent the collector voltage rising substantially above zero during alternate half cycles of said source and for producing a voltage differential between said base electrode and said collector electrode during the other half cycles of said source, said voltage differential being effective to prevent the flow of current in said collector electrode.

4. A circuit arrangement for the control of an electric current derived from an alternating current source and supplied to a load circuit comprising, in combination a semi-conductor device having a base electrode and two other electrodes each of which other electrodes will function as an emitter electrode whilst the other functions as a collector electrode said load circuit being connected in series with said source between said two other electrodes; and a resistor connected between said base electrode and one of said other electrodes, the resistance of said resistor being such that, during alternate half cycles of the source, it passes sufficient base current to render the emitter current carried by the other electrode of a value sufficient to prevent the collector voltage rising substantially above zero.

5. A circuit arrangement for the control of an electric current derived from an alternating current source and supplied to a load circuit comprising, in combination a semi-conductor device having a base electrode and two other electrodes each of which other electrodes will function as an emitter electrode whilst the other functions as a collector electrode said load circuit being connected in series with said source between said two other electrodes; a resistor connected at one end thereof to said base electrode; and means for transferring the other end of said resistor from one of said other electrodes to the other and vice versa, the resistance of said resistor being such as to cause emitter current of a value sufficient to prevent the collector voltage rising substantially above zero to flow, during alternate half cycles of the source in that electrode to which said resistor is not connected.

6. A circuit arrangement for the control of an electric current derived from an alternating current source and supplied to a load circuit comprising, in combination, a semi-conductor device having a base electrode, an emitter electrode and a collector electrode, said load circuit being connected in series with said source between said collector electrode and said emitter electrode; and a resistor connected between said base electrode and said collector electrode, the resistance of said resistor being of such a magnitude that, during alternate half cycles of said source, emitter current of a value sufficient to prevent the collector voltage rising substantially above zero flows in said emitter electrode.

7. A circuit arrangement for the control of an electric current derived from an alternating current source and supplied to a load circuit comprising, in combination, a semi-conductor device having a base electrode and two other electrodes, each of which other electrodes will function as an emitter electrode whilst the other functions as a collector electrode said load circuit being connected in series with said source between said two other electrodes; a first resistor connected between said base electrode and one of said two electrodes; a second resistor; and a contact connected in series with said second resistor between said base electrode and the other of said two electrodes, said contact being operable between an open position and a closed position and the relative resistances of said resistors being such that when said contact is closed the base current during alternate half cycles of said source is predominantly negative.

8. A circuit arrangement for the control of an electric current derived from an alternating current source and supplied to a load circuit, comprising, in combination, a semi-conductor device having a base electrode, an emitter electrode and a collector electrode, said collector electrode being connected in series with said load circuit; means for providing pulses of emitter current of a value sufficient to prevent the collector voltage rising substantially above zero during at least part of alternate half cycles of said source; and means for biassing said base electrode positively relative to said emitter electrode during the other half cycles.

9. A circuit arrangement for the control of an electric current derived from an alternating current source and supplied to a load circuit, comprising, in combination, a semi-conductor device having a base electrode, an emitter electrode and a collector electrode, said collector electrode being connected in series with said load circuit; means for providing pulses of emitter current of a value sufficient to prevent the collector voltage rising substantially above zero during at least part of alternate half cycles of said source; means for adjusting the duration of said part of said half cycles; and means for biassing said base electrode positively relative to said emitter electrode having the other half cycles.

10. A circuit arrangement for the control of an electric current derived from an alternating current source and supplied to a load circuit comprising, in combination, a circuit arrangement for the control of an electric current derived from an alternating current source and supplied to a load circuit comprising, in combination, a semi-conductor device having a base electrode and two other electrodes each of which other electrodes will function as an emitter said load circuit being connected in series with said source between said two other electrodes; a first means connected between said base electrode and one of said other electrodes for providing pulses of negative base current during at least part of alternate half cycles of said source and for biassing said base electrode positive relative to said one electrode during the remaining half cycles, and a second means connected between said base electrode and the remaining electrode for providing pulses of negative base current during at least part of said remaining half cycles and for biassing said base electrode positively relative to said remaining electrode during said alternate half cycles.

11. A circuit arrangement for the control of an electric current derived from an alternating current source having a tapping and supplied to a load circuit comprising, in combination; a circuit arrangement for the control of an electric current derived from an alternating current source and supplied to a load circuit comprising, in combination, a semi-conductor device having a base electrode and two other electrodes each of which other electrodes will function as an emitter electrode whilst the other functions as a collector electrode said load circuit being connected in series with said source between said two other electrodes; a connection between said base electrode and said tapping; a first pulse generating circuit connected between one of said other electrodes and said source on one side of said tapping; and a second pulse generating circuit connected between the remaining electrode and said source on the other side of said tapping; each of said pulse generating circuits comprising a half wave rectifier and a first adjustable resistor connected in series with a parallel connected condenser and a second adjustable resistance.

References Cited in the file of this patent

UNITED STATES PATENTS

| | | |
|---|---|---|
| 2,647,957 | Mallinckrodt | Aug. 4, 1953 |
| 2,693,568 | Chase | Nov. 2, 1954 |
| 2,698,392 | Herman | Dec. 28, 1954 |
| 2,820,143 | D'Nelly et al. | Jan. 14, 1958 |
| 2,827,611 | Beck | Mar. 18, 1958 |